G. HOFFMAN.
PRESS FOR MAKING BRICK, TILE, AND BUILDING BLOCKS.
APPLICATION FILED DEC. 19, 1908.

972,375.

Patented Oct. 11, 1910.
6 SHEETS—SHEET 1.

Witnesses
F. C. Gibson.
C. Bradway.

Inventor
Gustav Hoffman.
By Victor J. Evans
Attorney

G. HOFFMAN.
PRESS FOR MAKING BRICK, TILE, AND BUILDING BLOCKS.
APPLICATION FILED DEC. 19, 1908.

972,375.

Patented Oct. 11, 1910.

Inventor
Gustav Hoffman.

Witnesses
F. C. Gibson.
C. Bradway.

By Victor J. Evans
Attorney

G. HOFFMAN.
PRESS FOR MAKING BRICK, TILE, AND BUILDING BLOCKS.
APPLICATION FILED DEC. 19, 1908.

972,375.

Patented Oct. 11, 1910.

Witnesses
F. C. Gibson.
C. Bradway.

Inventor
Gustav Hoffman
By Victor J. Evans,
Attorney

UNITED STATES PATENT OFFICE.

GUSTAV HOFFMAN, OF ST. PAUL, MINNESOTA.

PRESS FOR MAKING BRICK, TILE, AND BUILDING-BLOCKS.

972,375.  Specification of Letters Patent.  Patented Oct. 11, 1910.

Application filed December 19, 1908. Serial No. 468,407.

*To all whom it may concern:*

Be it known that I, GUSTAV HOFFMAN, a citizen of the United States, residing at St. Paul, in the county of Ramsey and State of Minnesota, have invented new and useful Improvements in Presses for Making Brick, Tile, and Building-Blocks, of which the following is a specification.

This invention relates to a press for making brick, tile and various kinds of building blocks, and relates more particularly to a machine for automatically feeding the materials in proper proportion, the mixing and moistening the material and supplying the materials when thoroughly mixed and moistened to the mold or molds wherein the material is formed into plain or fancy blocks, bricks or tiles.

The invention has for one of its objects to improve and simplify the construction and operation of machines of this character so as to be comparatively simple and inexpensive to manufacture, reliable and efficient in use, and so designed that the various operations are carried out automatically, it being merely necessary to maintain a supply of constituent materials, and to receive the blocks, brick or tile as they are delivered from the machine.

Another object of the invention is the provision of a plurality of mixing drums into the upper one of which the materials to be mixed are supplied, and between the drums is a controllable device for supplying water to the materials to produce the proper consistency when the material is further mixed in the second drum.

A further object of the invention is to provide means whereby the supply of water will be regulated in accordance with the amount of material feeding from one drum to the other so that substantially uniform consistency of the mixed material can be maintained.

An additional object is the employment of simple and effective means for automatically feeding pallets to and from the mold for receiving the blocks, bricks or tiles.

A further object is to provide a reciprocatory head carrying the press blocks which coöperate with the mold to form the bricks, in connection with a feed box for supplying the material to the mold, the box being moved back and forth over the mold in timed relation to the movement of the head so as to be out of the way of the latter during the pressing operation.

A still further object is to provide means for dusting the pallets and mold blocks with an anti-adhering waterproof powder so that the material will not adhere to the parts.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention,

Similar reference characters are employed to designate corresponding parts throughout the views.

Referring to the drawings, A designates the frame of the machine which is mounted on a bed consisting of spaced parallel beams 1 supported on cross pieces 2. The frame A is of any approved construction and arranged therein are rotary drums B and C disposed one above the other and each provided with a central shaft 3 journaled in bearings 4 on the frame A. Each drum is provided with an annular gear 5 extending around the same at the middle and meshing with both gears is a pinion 6 secured to the main driving shaft 7 which is journaled on the frame A at a point between the two drums, one end of the shaft being extended and provided with loose and tight pulleys 8 and 9, whereby the shaft can be driven from any source of power through a belt. Obviously, any other suitable driving arrangement may be employed for rotating the drums simultaneously.

Figure 4:
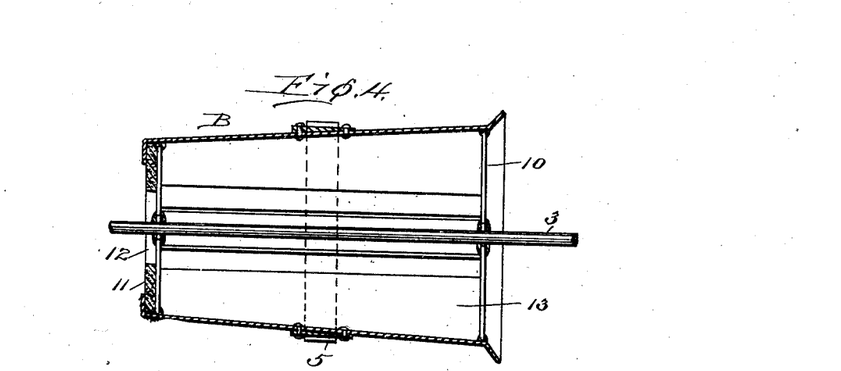
Fig. 4 is a longitudinal section of one of the mixing drums.

The drums B and C are substantially the same in construction and arrangement except that the latter drum is reversely arranged with respect to the former. As shown in Fig. 4, each drum is constructed of sheet metal and is of slightly tapered form so that material will be gradually conducted from the larger to the smaller end as the drum rotates. The larger end 10 is entirely open to permit the mixed material to work out while the smaller end is partially closed by a head 11 that is provided with a central opening 12 through which the material to be mixed is delivered. The mixing is facilitated by a plurality of longitudinally-extending internal vanes or ribs 13 which are rigidly secured in position against the internal surface of the drum. These ribs do not extend inwardly to the shaft, so that the pockets between adjacent ribs open into each other for permitting the material to drop from one pocket to the other as the drum rotates and thus become thoroughly mixed.

Figures 8, 9, 10, 11, 12:
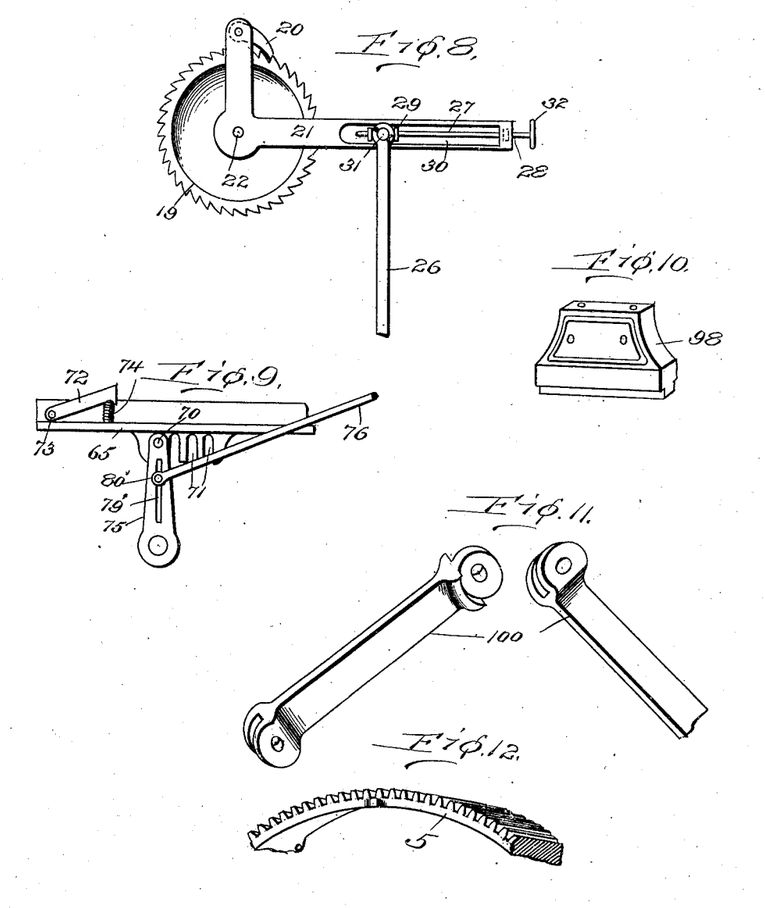
Fig. 8 is a detail view of the means for adjusting the feed of the raw material from the hopper or bin to the first drum.
Fig. 9 is a fragmentary view showing the pallet-feeding device.
Fig. 10 is a perspective view of one of the press blocks.
Fig. 11 is a perspective view of two of the toggle links for operating the pressing head.
Fig. 12 is a fragmentary view of the gear for one of the drums.

The material from which the blocks, tile and the brick are formed is supplied from a hopper or bin D arranged at the top of the frame A above the upper drum and this hopper is divided into two compartments 14 and 15 for receiving, respectively, sand and cement. The lower end of the hopper is formed into a chute 16 which has its lower end deflected into the opening 12 of the drum B, the hopper having walls that slip toward the upper end of the chute 16, as clearly shown in Fig. 6. At the generator between each compartment of the hopper and the chute 16 is a measuring device 17, such device being in the form of a rotary element having pockets 18 which are adapted to receive material from the hopper and discharge it into the chute as the element rotates. The elements have their outer journals extending through the opposite walls of the chute 16 and these journals are provided with ratchet wheels 19, and coöperating with each is a pawl 20 whereby the measuring elements 17 can be rotated in a step by step manner. The pawls 20 are mounted each on a bell crank lever 21 fulcrumed on the extended journal 22 of the adjacent measuring element 17, and these levers are operated by suitable mechanism deriving power from the main shaft or other suitable part of the machine. In the present instance, the shaft 3 of the upper drum is provided at one end with a crank arm 23, Fig. 1, to which are connected oppositely-extending rods or links 24 that are connected with bell crank levers 25 fulcrumed at 26$^a$ on the supporting frame and these bell crank levers are, in turn, connected by rods 26 with the pawl-carrying levers 21. By this arrangement, the rotation of the crank arm 23 causes the bell crank levers 25 to oscillate so that the pawl-carrying levers 21 will also oscillate and move the measuring elements 17 step by step for proportioning the material fed from both compartments of the hopper to the upper mixing drum. It is preferable to provide adjusting means whereby the proportion of sand and cement can be varied at will, and for this purpose, the adjustment shown in Fig. 8 is provided. Each pawl-carrying lever 21 is provided with a screw 27 threaded at 28 in the outer end of the lever and on the screw is a block 29 that moves back and forth in a slot 30 in the lever and the upper end of the connecting rod 26 is pivotally connected at 31 with the said block. By turning the hand wheel 32 on the outer end of the screw, the block 29 can be moved toward or away from the center 22 to vary the throw of the pawl-carrying lever and hence regulate the range of movement of the feed measuring device 17. It must be seen that the proportion of one material to the other can be adjusted to a nicety.

Figure 3:
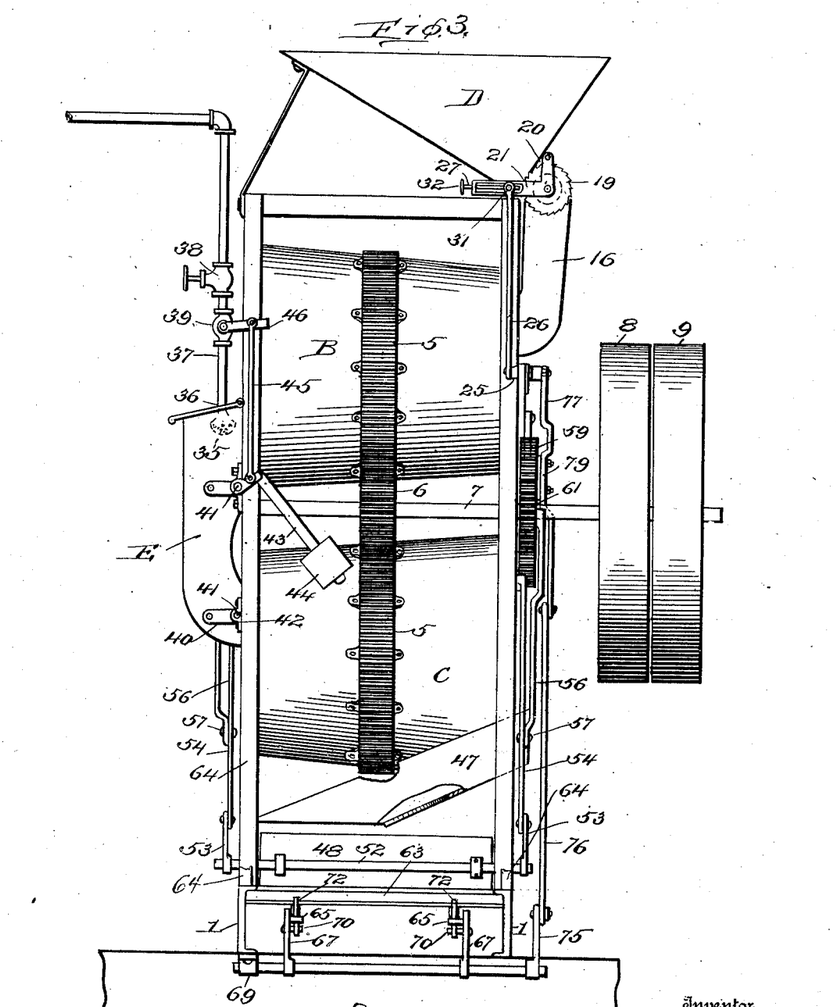
Fig. 3 is an elevation at the opposite side of the machine from Fig. 2.
Figures 5, 6, 7:
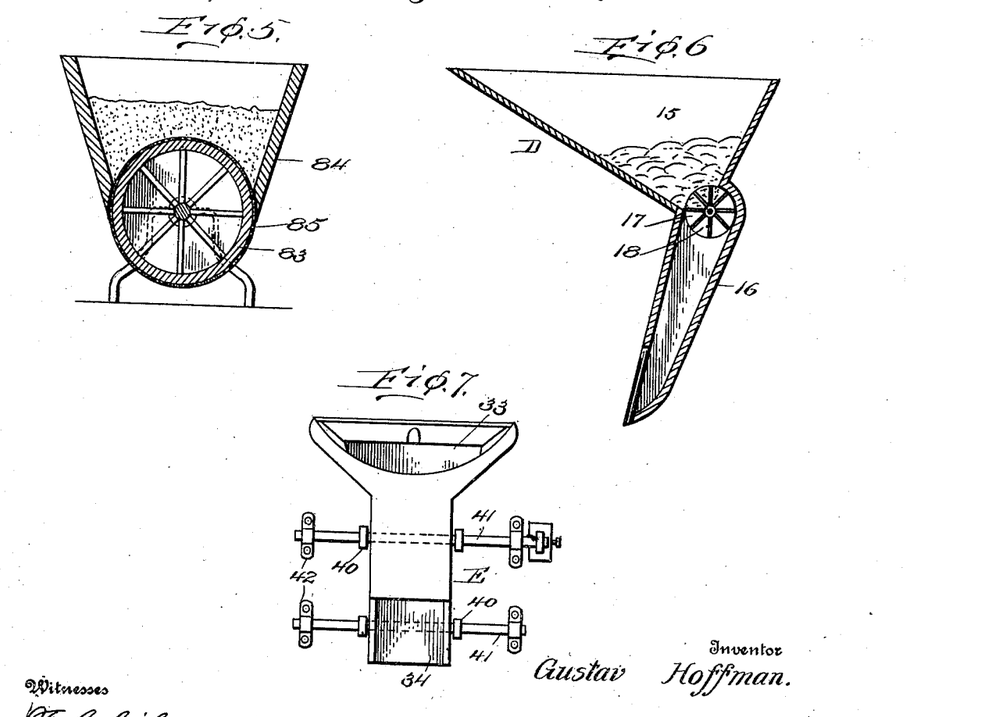
Fig. 5 is a transverse section of the device for dusting the pallets.
Fig. 6 is a detail sectional view on line 6—6, Fig. 1.
Fig. 7 is an elevation of the chute between the two mixing drums.

The sand and cement are mixed in a dry state in the upper drum B and the material is conducted from the upper to the lower drum through a chute E at the side of the machine opposite from the chute 16. As shown in Fig. 7, the upper end of the chute E is formed into an expanded mouth 33 into which the material is delivered from the upper drum. The lower drum of the chute E has a laterally-discharging opening 34 which communicates with the lower drum through the opening 12 therein. The partially mixed material is moistened while passing through the chute E by water sprayed into the upper end of the chute through a rose or spraying device 35 that enters the top of the chute through an opening 36, Fig. 3. The rose is attached to a supply pipe 37 arranged at one side of the machine and connected with a suitable source of supply, and in this pipe is a hand-controlled valve 38 whereby the supply of water can be adjusted.

The supply of water is adapted to be controlled in proportion to the quantity of material passing from one mixing drum to the other so that a substantially uniform consistency of the plastic material can be maintained. The chute E is mounted in such a manner as to rise or fall in accordance with the weight of the material contained therein, and this movement controls a valve 39 in the pipe 37, so that as the chute lowers with an increasing supply of material, the valve will open to a greater extent to admit more water, and the operation is reversed when the weight of the material in the chute diminishes. The chute is mounted on links or arms 40 arranged at the sides of the chute and secured to horizontally-disposed rock shafts 41 journaled in bearings 42 on the main frame. On one end of the upper rock shaft 41 is a crank arm 43 which carries a weight 44 which counterbalances the weight of the chute E. The arm 43 is connected by a link 45 with a handle 46 on the controlling valve 39. It will thus be seen that the vertical movement of the chute E causes the valve 39 to open or close to vary the supply of water in accordance with the amount of material passing through the chute.

The moistened material becomes thoroughly mixed in the lower mixing drum C which is churned over and over again as the drum rotates, and the material thus mixed passes out of the larger end of the drum upon an inclined chute 47 supported in fixed position on the frame A at a point under the drum, and the lower end of this chute is disposed over a feed box 48 which conducts the material periodically to the mold. The feed or filler box 48 rests on a horizontal plate 49, Fig. 13, supported on the bed of the machine, and the filler box slides back and forth on the plate to supply material to the mold 50, the top of which is flush with the plate 49. In the filler box are scrapers 51 which cause the material in the filler box to be moved toward the front of the latter during the return movement of the filler box so that the material will be in proper position to be dropped into the mold 50 as the filler box is moved forwardly over the mold. Attached to the filler box is a horizontal shaft 52 to which are hingedly connected links 53 that are in turn connected with levers 54 fulcrumed on the main frame at 55. The levers 54 are oscillated by connecting rods 56 that have their lower ends hingedly connected with the levers at 57, while the upper ends are connected with crank pins 58 on gear wheels 59 that are secured to the end of a horizontal shaft 60 mounted on the main frame, the said gear wheels meshing with pinions 61 arranged on the main driving shaft 7, as clearly shown in Fig. 1.

Figures 13, 14, 15, 16:
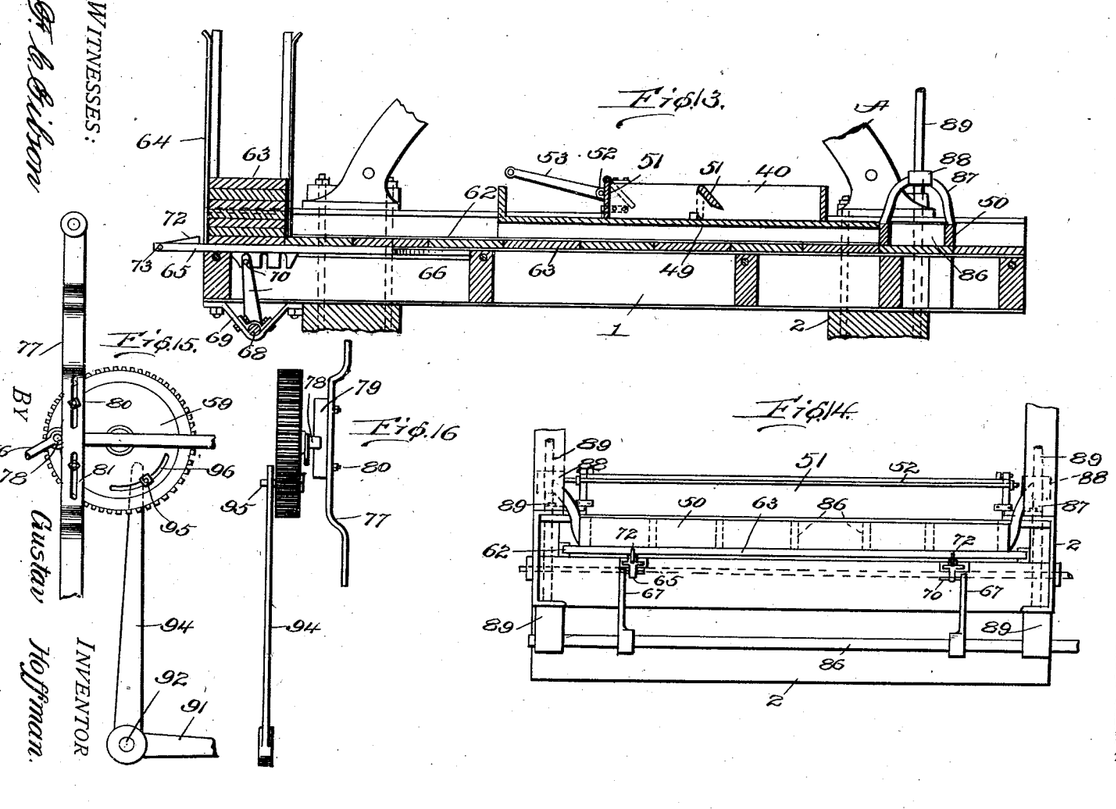
Fig. 13 is a longitudinal sectional view of the base portion of the machine.
Fig. 14 is an end view of Fig. 13.
Fig. 15 is a fragmentary view of the wheel for operating the pallet-feeding device, pressing head and the mold lifting lever.
Fig. 16 is a side view of Fig. 15.

The bed of the machine is provided with parallel guideways 62 arranged, respectively, on the inner or opposed faces of the beams 1. In these guideways or tracks 62, which are of channeled cross section, as shown in Fig. 14, are slidably supported pallets 63 which are arranged in contact one behind the other and are fed step by step to and past the mold for receiving the blocks, bricks or tiles molded by the machine. At one side of the machine is a rack or holder consisting of four upright angle irons 64 for supporting a pile of pallets, as shown at the left end of Fig. 13, and the pallets are fed from the pile at the bottom thereof into the guideways 62. The pallet-feeding device consists of a pair of reciprocatory elements or bars 65 slidable in guides 66 which are supported on the bed of the machine at a point under the pile. The said elements 65 are moved back and forth by oscillatory arms 67 carried by a transverse horizontally-disposed rock shaft 68 which is mounted in bearings 69, the upper ends of the arms being provided with pins 70 which are adapted to engage in any of a plurality of notches 71 provided in the said elements 65. On each element 65 is a pawl or dog 72 pivoted at its outer end on a pivot 73 and so arranged that the inner end thereof will engage the outer edge of the lowermost pallet in the pile so as to move the latter from under the pile as the element is moved to the right, Fig. 13. As shown in Fig. 9, each pallet-engaging dog is urged upwardly by a spring 74 which yields to permit the dog to swing downwardly flush with the top surface of the element 65 as the latter is moved under the pile to the left. As soon as the dogs pass from under the pile, they are forced upwardly by springs so as to be in position to engage the next pallet and move the same out of the pile during the succeeding movement of the element 65 to the right. In this manner, the pallets are fed step by step from the pile to the mold and the pallets between the pile and the mold are moved progressively by each pallet as it is forced out of the pile in the holder 64. The rock shaft 68 is provided at one end with a crank arm 75 which is connected by a rod 76 with an oscillatory lever 77 fulcrumed at 78' on the main frame A, the arm 75 having a slot 79' for receiving the bolt 80' for adjustably connecting the rod 76 with the arm to accommodate the movement of the pallet-feeding elements to the width of the pallets. The lever 77 is periodically actuated by a pin 78 on the front cog wheel 59, which pin engages an abutment or plate 79 on the lever. This abutment 79 is adjustably connected with the lever by a bolt 80 engaging in longitudinal slots 81 in the lever so that the period of engagement of the pin with the abutment can be adjusted at will. The pin 78 passes, during a certain period of the revolution of the gear wheel 59, over one end of the abutment 79 and engages behind the same so as to move the lever 77 in one direction, the pin sliding along the abutment until it passes off the same at the opposite end. In this manner, the lever is positively actuated in one direction to feed the pallets forwardly, and as soon as the pin passes off the abutment 79, the lever 77 is returned to normal position by an extension spring 82 which has one end connected to the lever adjacent the free end thereof and the opposite end connected with a suitable part of the main frame A. By adjusting the plate or abutment 79, the pallet-feeding device can be properly timed with respect to the other working parts of the machine.

As the pallets are moved forwardly toward the mold, they pass under a powdering wheel or drum 83 mounted on the bed of the machine and arranged in the bottom of a hopper 84, as shown in Fig. 5. This hopper is adapted to contain some waterproof powder and on the drum is a coating 85 of wool or other suitable material which conducts the powder from the hopper to the top surfaces of the pallets, the drum being frictionally driven by contact with the pallets.

The mold 50 is of any desired size and shape and preferably formed with a plurality of compartments 86, as shown in Fig. 14, and on the ends of the mold are upwardly-extending arms 87 formed with collars 88 through which extend stationary guide rods 89 mounted on the main frame. After the pressing operation, the mold is raised to a suitable distance for permitting the pallet thereunder having the molded blocks, bricks or tiles, to pass outwardly from under the mold. For this purpose, the mold is pivotally connected at 90, Fig. 1, with the short arms 91 of bell crank levers fulcrumed at 92 on bearings 93 that are secured to the main frame. The long arms 94 of the bell crank levers extend upwardly through the gear wheels 59 and on these gear wheels are adjustable pins 95 which, by the rotation of the gear wheels, are adapted to engage the levers to oscillate the same in a direction to raise the mold. The pins 95 are adjustably mounted in arcuate slots 96 in the gear wheels 59 so as to properly time the raising of the mold. After the pins pass the extremities of the bell crank levers, the mold will drop by gravity upon the succeeding pallet which, in the meantime, has been advanced another time.

Disposed over the mold is a vertically-movable head 97 on which are mounted movable press blocks 98 that are adapted to enter the compartments of the mold and compress the material therein, the said blocks being of any desired shape, according to the style of brick, block or tile to be formed. The ends of the head are provided with sleeves 99 through which the vertical guide rods 89 extend and on these rods the block-carrying head 97 works up and down. The said head is operated by two sets of toggle links 100 which are collapsed and straightened by connecting rods 101 that are connected with the gear wheels 59 by the pins 58. The lower links are hingedly connected at 102 with the head 97 and the upper ends of the other links are hingedly connected at 103 with the bracket 104 extending from one side of the main frame A, connecting rods 101 being connected with the ends of the shaft 105 that extend through the knuckles at the inner or meeting ends of the toggle links. As the gear wheels 59 rotate, the press block carrying head is moved up and down by the straightening and collapsing of the toggle links, the movement of the head being properly timed with relation to the proper movement of the mold so that the blocks will be compressed in the latter and forced out at the required period.

Figure 1:
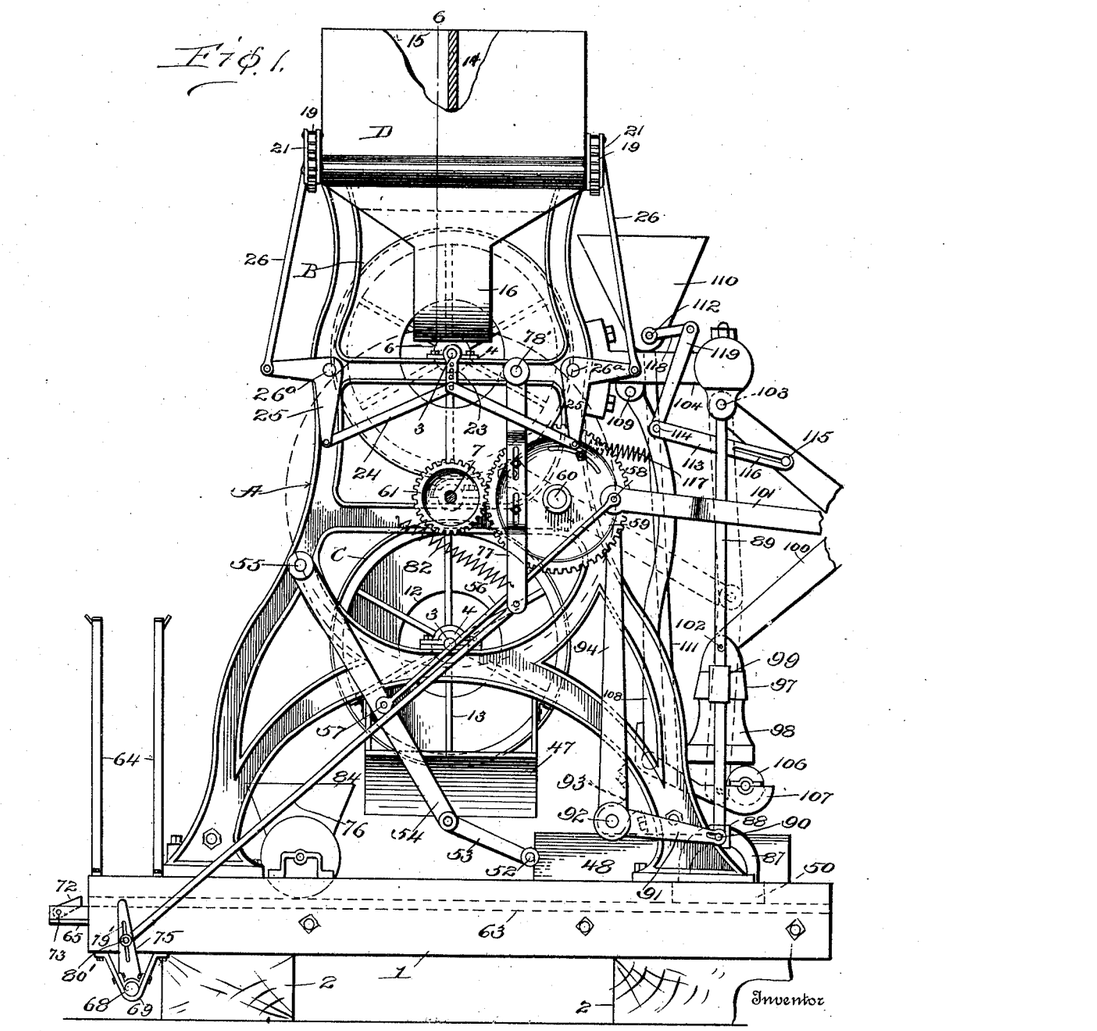
Figure 1 is a front view of the machine with the front portion of the driving shaft in section and with a portion of the feed bin or hopper broken away.
Figure 2:
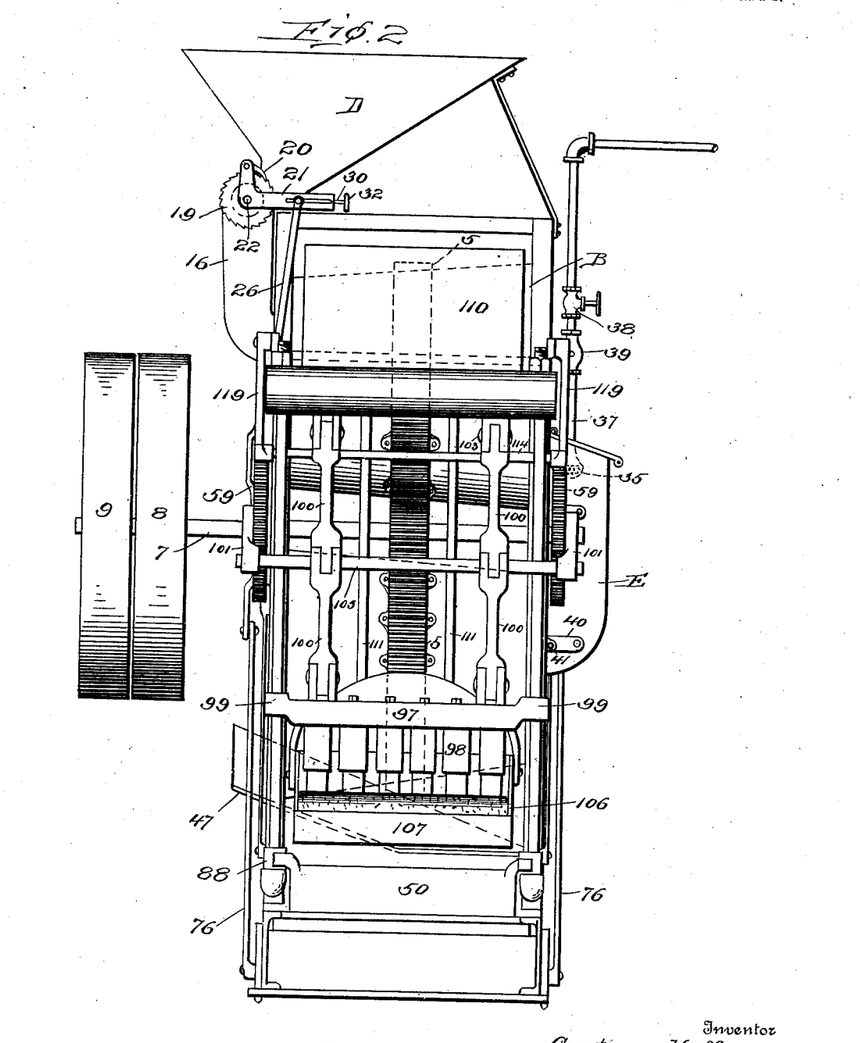
Fig. 2 is an elevation at the delivery end of the machine.

The press blocks are adapted to be powdered with some suitable waterproof powder, while the head is in raised position so that the material would not adhere to the press blocks. As shown in Fig. 1, a roller 106 is mounted to move back and forth under and contacting with the bottom faces of the press blocks to cover the same with powder, and this roller works in a powder-carrying can 107 which is supported on the lower end of links or levers 108 which have their upper ends pivotally mounted at 109 on the bracket 104. Supported on the bracket 104 is a hopper 110 from which material is supplied to the pan 107 by pipes 111, the supply of material being controlled by a valve arranged on the shaft 112 for opening and closing the upper ends of the pipes 111 to allow a small quantity of powder to periodically pass to the pan 107. The levers 108 are operated in one direction by links 113 hingedly connected at 114 with the levers and connected, by pins 115, with the upper toggle links 100, the links 113 having longitudinal slots 116 through which the pins 115 extend. The levers 108 are moved in the opposite direction by extension springs 117 connected with the levers and with suitable parts of the main frame A. On the valve rod 112 is a crank arm 118 which is connected by a link 119 with one of the levers 108 so that as the toggle links for operating the block-carrying head are collapsed and straightened, the valve rod 112 is rocked and the powdering roll 106 moves back and forth so as to apply powder to the pressing faces of the press blocks.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim is:—

1. In a machine of the class described, the combination of a mold, a pressing element coöperating therewith, means for feeding pallets to the mold successively, a continuously rotating device for actuating the pressing element to compress the material in the mold, means for positively raising the mold to a given point and allowing it to lower by gravity, and means operated periodically by the said device for actuating the pallet feeding means.

2. In a machine of the class described, the combination of a plurality of upright angle irons spaced apart to engage the corners of a number of pallets arranged in a pile, and means for periodically removing the lowermost pallet from the pile, said means consisting of spaced slide bars, a rock shaft extending transversely to and disposed under the bars, and arms on the shaft adjustably connected with the bars, yielding dogs carried by the bars for engaging the lowermost pallet, a crank and pitman connection for rocking the shaft, a lever connected with the pitman, and a device arranged to periodically engage the lever at a point between its fulcrum and its connection with the pitman for oscillating the lever.

3. In a machine of the class described, the combination of a holder for a pile of pallets, a reciprocatory device disposed under the pile for removing the lowermost pallet therefrom, a rock shaft operatively connected with the said device, a crank on the rock shaft, a pitman connected with the crank, a swinging arm or lever having its free end connected with the pitman, a spring connected with the arm for moving the same in one direction, an abutment adjustable longitudinally on the arm, and a revolving device for periodically engaging the abutment and to move the arm in position to the spring and arranged to slide off the abutment to permit the spring to come into play.

4. In a machine of the class described, the combination of a holder for a pile of pallets, a reciprocatory element disposed under the pile, a spring-pressed dog on the element adapted to engage the lowermost pallet of the pile for removing the pallet laterally, a gear wheel, a pin projecting from the wheel, a swinging member extending across the wheel and arranged to swing on an axis parallel to the plane of rotation of the latter, an abutment adjustable longitudinally on the member to be engaged by the said pin and automatically released from the latter after the pin moves the member to a predetermined point, and operating connecting means between the said member and element.

5. In a machine of the class described, the combination of a device for holding a pile of pallets, a guideway, and means for feeding the pallets step by step from the pile and through the guideway, said means comprising a rock shaft, reciprocatory elements, arms on the rock shaft, means on the elements with which the arms can be connected at different points for varying the range of movement of the elements, means for supporting the elements under the pile of pallets, and dogs on the elements arranged to engage the lowermost pallet to move the latter into the guideway as the elements are actuated in one direction.

6. In a machine of the class described, the combination of a mold, a plate disposed at one side of the mold and substantially flush with the top of the latter, a filler box slidably mounted on the plate and arranged to supply material to the mold, a device for feeding pallets under the plate and mold, and means for actuating the said box, said box having a scraper arranged to engage the plate during the feeding movement and movable away from the plate to permit material to pass during the opposite movement.

7. In a machine of the class described, the combination of a vertically movable mold, a vertically movable presser block, a bell crank lever connected with the mold, a wheel, an adjustable pin on the wheel arranged to periodically wipe against the lever for raising the mold and to permit the mold to lower by gravity when the pin passes off the lever, toggle links connected with the presser block, and a member pivotally connected at one end with the wheel and with the toggle links for operating the presser block to compress the material in the mold and for forcing the compressed material out of the mold as the latter rises.

8. In a machine of the class described, the combination of a mold, a presser block coöperating therewith, means for applying powder to the presser block, a powder-feeding hopper, means for operating the presser block, and a device operated by the said last-mentioned means for controlling the feed of powder from the hopper.

9. In a machine of the class described, the combination of a reciprocatory head, presser blocks mounted thereon, means for actuating the head, a powdering device movable back and forth over the faces of the blocks, means for operating the said device, a fixed hopper, and means extending between the hopper and device for feeding powder to the latter.

10. In a machine of the class described, the combination of a presser block, means for actuating the same, and a device for powdering the face of the presser block, said device comprising a drum adapted to roll over the face of the block, a pan holding the powder in coöperative relation with the drum and in which the latter rotates, and means for moving the pan back and forth to rotate the drum by contact with the block.

11. The combination with a presser block, and means for actuating the same, of a powdering device movable back and forth over the face of the block, said device including a roller for applying the powder to the said face, a pan in which the roller is mounted, means for supporting the pan for a back and forth movement, a hopper, and means for conducting powder from the hopper to the pan.

In testimony whereof I affix my signature in presence of two witnesses.

GUSTAV HOFFMAN.

Witnesses:
    ARNOLD MUELLER,
    ALWINE HOFFMANN.